(No Model.)

W. PIEL.
TYPE CASE.

No. 296,350. Patented Apr. 8, 1884.

Attest:
Charles Pukle
Ged Wheelock

Inventor:
William Piel
By Knight Bros
Attys

UNITED STATES PATENT OFFICE.

WILLIAM PIEL, OF ST. LOUIS, MISSOURI.

TYPE-CASE.

SPECIFICATION forming part of Letters Patent No. 296,350, dated April 8, 1884.

Application filed September 28, 1883. (No model.)

*To all whom it may concern:*

Be it known that I, WILLIAM PIEL, of the city of St. Louis, in the State of Missouri, have invented a certain new and useful Improvement in Type-Cases, of which the following is a full, clear, and exact description, reference being had to the accompanying drawings, forming part of this specification, and in which—

Figure 1:
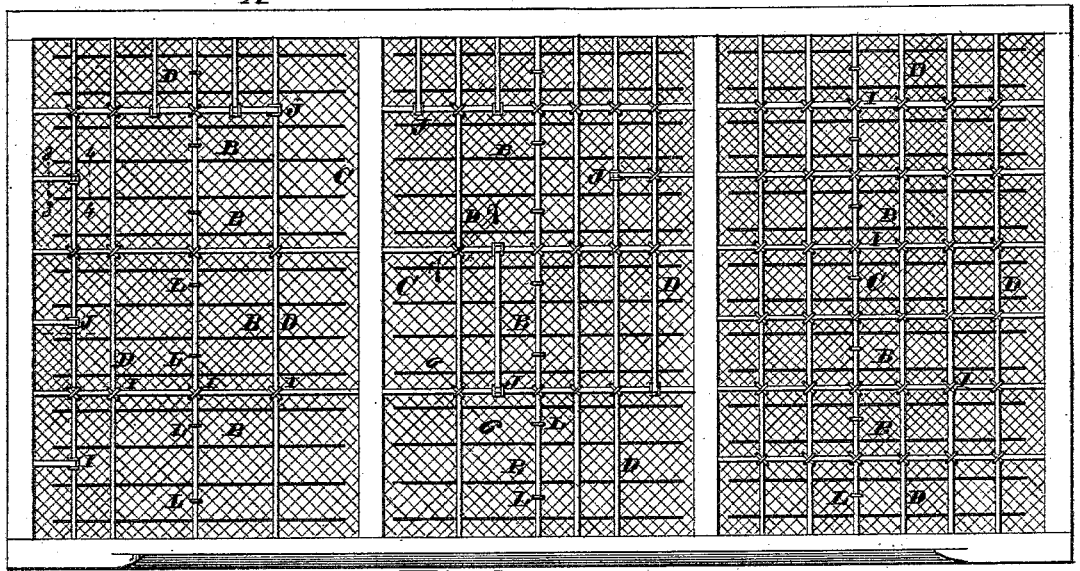
Figure 2:
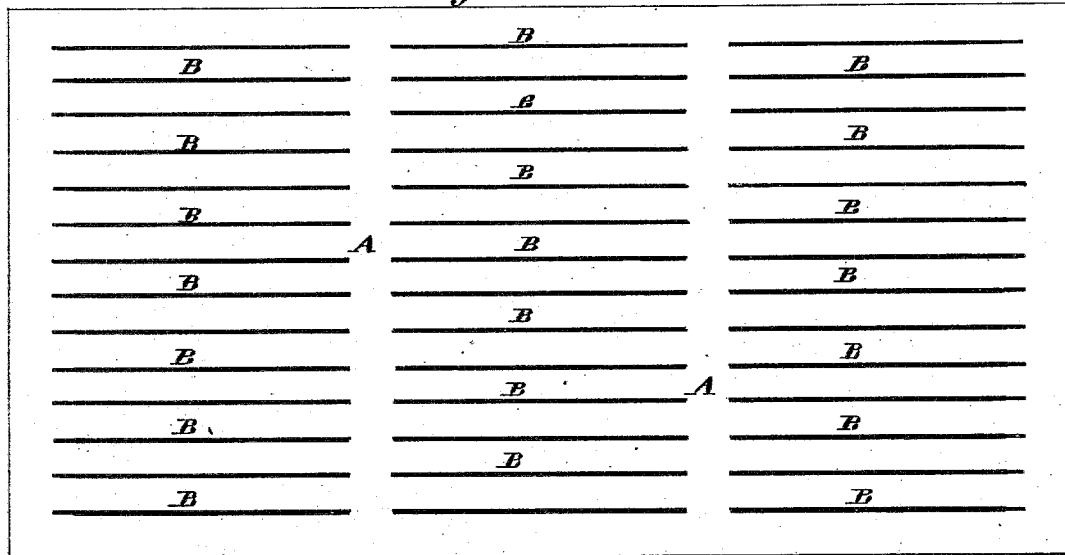
Figures 5, 6, 7, 8:
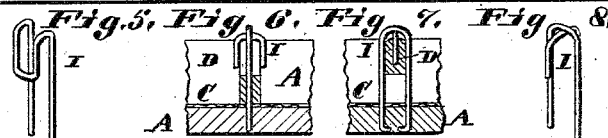
Figure 9:
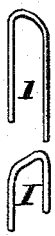

Figure 1 is a top view, showing a complete case of my improved construction. Fig. 2 is a bottom view of same. Figs. 3, 4, 6, and 7 are detail vertical sections taken, respectively, on lines 3 3, 4 4, 6 6, and 7 7, Fig. 1. Fig. 5 is a perspective view of one form of fastening, and Figs. 8 and 9 are similar views of another form, Fig. 9 showing the two parts of the fastening or nail disconnected.

My invention consists, first, in a type-case having a slotted bottom with a wire-gauze lining; and, secondly, in a certain kind of a fastening or nail, more fully described hereinafter.

Referring to the drawings, A represents a type-case of ordinary construction, except that slots B are made in the bottom, preferably two for each of the small divisions. The bottom is covered by a wire-gauze lining, C, beneath the division-boards D. When a type-case is thus made, dust and dirt will not collect in the bottom of the cells, and the edges of the slots will not become worn, for the type will be held off the wood bottom by the wire-gauze.

I do not claim to be the inventor of a type-case having a wire-gauze bottom without wood to support it, for I know that this is not original with me. The division-strips of the case are strengthened and bound together by fastenings I, (see Figs. 8 and 9,) which consist of nails having four prongs each—two long ones and two short ones—the former of which extend down through the bottom of the case, and are clinched, as shown plainly in Figs. 3 and 7. The short prongs extend down but a short distance, and are secured to or cast upon the long prongs, forming part of the same. The four prongs fit in the four adjacent corners of four divisions strengthening the strip.

Figures 3, 4:

Another form of nail is shown in Figs. 4 and 5, which is formed as shown in Fig. 5, and which would be used where there are only three corners, as shown at J, Fig. 1.

Suitable nails, L, may be used to connect the bottom and division-strip between the fastenings I. (See Fig. 1.)

I claim as my invention—

1. A type-case having slots formed in its bottom, and wire-gauze covering the bottom, for the purpose set forth.

2. In a type-case, the combination, with the division-strips, of the four-prong fastening, two of the prongs extending down through the bottom of the case, and the other two being quite short, substantially as set forth.

WILLIAM PIEL.

In presence of—
GEO. H. KNIGHT,
J. WAHLE.